United States Patent [19]
Ueki et al.

[11] Patent Number: 5,825,718
[45] Date of Patent: Oct. 20, 1998

[54] UNDERWATER COMMUNICATION APPARATUS AND UNDERWATER MICROPHONE, AND CLOSED-TYPE SOUND CONVERTER

[75] Inventors: Masataka Ueki; Shouzou Kimura; Masaharu Ueki, all of Jouetsu, Japan

[73] Assignee: UETAX Corporation, Nigata-ken, Japan

[21] Appl. No.: 912,721

[22] Filed: Aug. 18, 1997

[30] Foreign Application Priority Data

Aug. 30, 1996 [JP] Japan .................................. 8-230709

[51] Int. Cl.$^6$ ................................................ H04B 11/00
[52] U.S. Cl. ............................................................ 367/132
[58] Field of Search ................................... 367/132, 188, 367/165, 173

[56] References Cited

U.S. PATENT DOCUMENTS

| | | | |
|---|---|---|---|
| 3,064,089 | 11/1962 | Ward | 367/132 |
| 3,174,129 | 3/1965 | Laughlin et al. | 367/132 |
| 3,218,607 | 11/1965 | Brock et al. | 367/132 |
| 3,611,280 | 10/1971 | Sheehy | 367/182 |

*Primary Examiner*—Daniel T. Pihulic
*Attorney, Agent, or Firm*—Nixon & Vanderhye PC

[57] ABSTRACT

An underwater communication apparatus is provided which enables safe and clear speech transmission. An exhalation pipe which defines an acoustic space for communicating with an interior space of a mouthpiece is connected at one end to a site adjacent a breathing port of the mouthpiece. An exhaust valve which allows the flow of air only from the mouthpiece toward an exhaust port of the exhalation pipe is provided adjacent the exhaust port. A sound receiver portion having a capacitor microphone is provided within the exhalation pipe at a site upstream of the exhaust valve. When voice is uttered while the mouthpiece is held in the mouth, exhaled air is emitted from the exhaust port through the exhalation pipe and the exhaust valve, so that the capacitor microphone is less liable to noise trouble due to bubbles produced at the exhaust port, or on the downstream side. Speech transmission is made underwater by a waterproof speaker on the basis of an output of the capacitor microphone.

17 Claims, 5 Drawing Sheets

UNDERWATER COMMUNICATION APPARATUS AND UNDERWATER MICROPHONE, AND CLOSED-TYPE SOUND CONVERTER

BACKGROUND OF THE INVENTION

The present invention relates to an underwater communication apparatus for use in scuba diving and the like, and also to an underwater microphone and a closed-type sound converter, both for use in the underwater communication apparatus and the like.

Conventionally, various kinds of underwater communication apparatuses have been used in case that one stays underwater for a prolonged time period while breathing air supply delivered from a compressed-air filled cylinder through the intermediary of a hose. Typically, they are such that sound produced by a person in the course of such breathing is received by an underwater microphone and converted into an electric signal which is in turn transmitted on a line, or modulated into ultrasonic waves for being transmitted as audio information, or such that such sound is transmitted directly in the form of sound wave by actuating the underwater speaker.

Unfortunately, such conventional underwater communication apparatus has several drawbacks. One drawback is that since it is not possible to speak with an aqualung mouthpiece held in the mouth, when speaking underwater is required, it is necessary that both the mouthpiece held in the mouth and the underwater mask be removed, and replaced underwater with a separately prepared underwater mask fitted with a microphone. This mask changing operation involves a danger. Another drawback is that noise of exhaust air from the underwater mask and associated bubble noise are transmitted as considerable noise so that speech articulation is adversely affected. With underwater communication apparatus of the type in which sound signals are modulated into ultrasonic waves for being transmitted as acoustic information, the problem is that the apparatus is rather complicated in construction and involves higher cost, because the apparatus includes a microphone fitted within a full-mask type underwater mask covering the entire face of the wearer and, in addition, an ultrasonic transmitter-receiver. In the case of underwater communication apparatus of the type using a waterproof speaker, if the water depth is more than 10 m, sound transmission within an audio region is very difficult under the influence of water pressure, and this poses a problem that at such a depth of water any sufficient sound pressure is unobtainable so that speech is rendered inaudible.

SUMMARY OF THE INVENTION

Therefore, it is an object of the present invention to provide an underwater communication apparatus and underwater microphone which enable one to speak with the aqualung mouthpiece held in the mouth and to effect speech transmission in a safe condition, and which can produce clear and distinct speech.

It is another object of the invention to provide a closed-type sound converter which enables sufficient sound pressure to be had even where the depth of water is more than 10 m.

In order to achieve the aforementioned object, there is provided an underwater communication apparatus comprising an underwater microphone including an acoustic space member connected at one end to a site adjacent a breathing port of an aqualung mouthpiece to define an acoustic space communicating with an interior space of the mouthpiece, and a sound signal—electric signal converter device disposed in the interior of the acoustic space member for converting a sound signal into an electric signal; and a closed-type sound converter for transmitting a sound wave underwater on the basis of an output of the sound signal—electric signal converter device of the underwater microphone.

According to the first embodiment of the present invention, when speech is given with the mouthpiece held in the mouth, air in the acoustic space within the acoustic space member communicating with the interior space of the mouthpiece acts to transmit the speech. The air exhaled when the speech is given is exhausted from a regulator exhaust port communicating with the interior space of the mouthpiece. Therefore, where the water is so shallow as to allow easy exhalation, the sound signal—electric signal converter device may be, for example, placed away from the regulator exhaust port thereby to allow the exhaled air to be exhausted from the regulator exhaust port so that the sound is transmitted from the interior space of the mouthpiece through the acoustic space within the acoustic space member whereby the sound can be caught distinctly by the sound signal—electric signal converter device. In the case where the water is so deep as not to permit vigorous breathing out, the acoustic space member is provided, for example, with an exhaust port which in turn is provided with an exhaust valve, whereby exhaled air can be exhausted also from the exhaust port of acoustic space member to facilitate breathing out, so that the sound from the mouthpiece can be distinctly caught by the sound signal—electric signal convertor device. Thus, water transmits sound waves from the closed type sound converter which is actuated by an output from the sound signal—electric signal converter device of the underwater microphone. Therefore, the arrangement makes it possible to speak with the mouthpiece held in the mouth, thus enabling one to communicate safely at a clear and distinct speech level.

Also, there is provided an underwater communication apparatus, wherein:

the acoustic space member is an exhalation pipe provided with an exhaust valve which allows the flow of air only from the mouthpiece toward an exhaust port, the underwater microphone being disposed upstream of the exhaust valve.

According to the second embodiment of the present invention, where the water pressure is high, the existence within the exhalation pipe of the acoustic space communicating with the internal space of the mouthpiece facilitates breathing out even when speech is given with the mouthpiece being held in the mouth, the sound produced being transmitted by the air present in the acoustic space within the exhalation pipe. The air that is exhaled when the sound is uttered is exhausted through the exhalation pipe and exhaust valve. In this case, for example, the exhaust port of the exhalation pipe may be positioned higher than the regulator exhaust port. By so doing it is possible to allow air from the exhaust port of the exhalation pipe, positioned nearer to the water surface, to be exhausted earlier because of a slight difference in water pressure. Therefore, the exhaust of bubbles from the regulator exhaust port does not coincide with the exhaust of bubbles from the exhaust port of the exhalation pipe and accordingly noise generation is reduced to enable clear and distinct catching of the sound. Furthermore, the air exhaled upon utterance of voice is exhausted in the form of bubbles from the exhaust port located downstream of the sound signal—electric signal converter device on the inner periphery of the exhalation pipe, and this retards the entry into the sound signal—electric signal converter device of the noise of bubbles from the downstream side, so that the sound from the upstream side, that is, from the mouthpiece side can be distinctly caught by the sound signal—electric signal converter device. Thus, water transmits sound waves from the closed-type sound converter which is actuated by an output from the sound signal—electric signal converter device of the underwater microphone. Therefore, where the water is so deep that exhaling is difficult, the arrangement permits one to speak with the mouthpiece held in the mouth, and thus to communicate safely at clear and distinct speech level.

Also, there is provided an underwater communication apparatus, wherein:

the underwater microphone includes a screen having pores for reducing in size bubbles of air exhausted from the exhaust valve.

According to the third embodiment of the present invention, bubbles of air exhausted from the exhaust port when voice is uttered are reduced in size by the screen to a practically possible extent and accordingly noise of bubbles can be reasonably controlled to enable the sound signal—electric signal converter device to catch sounds at an improved articulation level.

Also, there is provided an underwater communication apparatus, wherein:

the underwater microphone includes a bottom-closed cylindrical body disposed on the inner periphery of the exhalation pipe, with the sound signal—electric signal converter device fixed to an inner bottom of the cylindrical body, a diaphragm supported at an open end of the cylindrical body for vibratory movement in the axial direction of the cylindrical body, and an elastic member attached at one end to the inner side of the diaphragm through a resilient member and fixed at other end to the sound signal—electric signal converter device.

According to the fourth embodiment of the present invention, when vibrations of the diaphragm are transmitted to the sound signal—electric signal converter device through an air layer within the cylindrical body, sound within a sound range lower than the range of voices are canceled by the elastic member and, therefore, the noise of bubbles within the lower sound range can be minimized. As the water becomes deeper, the pressure of air applied on the diaphragm becomes greater according to the water pressure so that the diaphragm is forced inward against the biasing force of the elastic member so that the diaphragm is suitably retained in place according to the air pressure. Without the necessity of increasing the thickness of the diaphragm, therefore, an air layer can be secured for transmitting a sound signal between the diaphragm and the sound signal—electric signal converter device. Thus, an underwater communication apparatus having an underwater microphone capable of withstanding the water pressure at a water depth of 40 m can be realized. Further, by reducing the thickness of the diaphragm of the underwater microphone it is possible to enhance the performance of the microphone in respect of sound collection and sound quality. The elastic member may be comprised of sponge or a spring.

Also, there is provided an underwater communication apparatus, wherein:

the closed-type sound converter includes a closed vessel having an elastically deformable acoustic diaphragm, an electric signal—mechanical vibration signal converter device mounted in the closed vessel so as to join with the acoustic diaphragm which is operative to convert an electric signal into a mechanical vibration signal thereby to vibrate the acoustic diaphragm through a joint portion, and an elastically deformable support plate disposed in the closed vessel to define an enclosed space in cooperation with the acoustic diaphragm and to support the electric signal—mechanical vibration signal converter device.

According to the fifth embodiment of the present invention, by adjusting the thickness of acoustic diaphragm joined to the electric signal—mechanical vibration signal converter device thereby to adjust the characteristic frequency of the acoustic diaphragm to, for example, a frequency (e.g., 3.4 kHz) within a medium voice range in particular, sound of voices within the medium voice range is intensified by resonance of the acoustic diaphragm so that sufficient sound pressure can be obtained in the medium voice range. Thus, any sound pressure in an acoustic range lower than the range of voices can be suppressed and, therefore, acoustic information transmitted underwater through vibrations of the acoustic diaphragm can be received at an improved articulation level. As the water becomes so deep that the water pressure is increased, the acoustic diaphragm is pressed inward to be elastically deformed so that, for example, air filled between the acoustic diaphragm and the support plate is compressed so that the support plate is elastically deformed and bent inward under the pressure of the compressed air. However, the electric signal—mechanical vibration signal converter device for vibrating the acoustic diaphragm through the joint portion is not liable to the influence of water pressure. Thus, an underwater communication apparatus having an underwater microphone capable of withstanding the water pressure at a water depth of 40 m can be realized.

Also, there is provided an underwater microphone comprising an exhalation pipe connected at one end to a site adjacent a breathing port of an aqualung mouthpiece to define an acoustic space communicating with an interior space of the mouthpiece, an exhaust valve provided in the exhalation pipe which allows the flow of air only from the mouthpiece toward an exhaust port, a sound signal—electric signal converter device disposed on the inner periphery side of the exhalation pipe and upstream of the exhaust valve and operative to convert a sound signal into an electric signal; and a screen having pores for reducing in size bubbles of air exhausted from the exhaust valve.

According to the sixth embodiment of the present invention, even if voice is uttered with the mouth piece being held in the mouth when the water pressure is high, the acoustic space provided in the interior of the exhalation pipe for communication with the interior space of the mouthpiece enables easy exhalation, and the air present in the acoustic space within the exhalation pipe acts to transmit sound of voices. The air exhaled upon voice being uttered is exhausted through the exhalation pipe and exhaust valve. In this case, for example, the exhaust port of the exhalation pipe may be positioned higher than the regulator exhaust port which communicates with the internal space of the mouthpiece. By so doing it is possible to allow air from the exhaust port of the exhalation pipe, positioned nearer to the water surface, to be exhausted earlier because of a slight difference in water pressure. Therefore, the exhaust of bubbles from the regulator exhaust port does not coincide with the exhaust of bubbles from the exhaust port of the exhalation pipe and accordingly noise generation is reduced to enable clear and distinct catching of the sound. Furthermore, the air exhaled upon utterance of voice is exhausted in the form of bubbles from the exhaust port located downstream of the sound signal—electric signal converter device on the inner periphery of the exhalation pipe, and this retards the entry into the sound signal—electric signal converter device of the noise of bubbles, so that the sound from the upstream side, that is, from the mouthpiece side can be distinctly caught by the sound signal—electric signal converter device. Bubbles of air which are exhausted from the exhaust port of the exhalation pipe when voice is uttered are reduced by the screen to a minimum possible size. Thus, on the basis of an output from the sound signal—electric signal converter device of the underwater microphone, for example, electric signals may be transmitted on a line, or such electric signal is supersonically modulated for being transmitted as acoustic information, or sound waves are transmitted underwater by the closed-type sound converter. Therefore, voices can be uttered with the mouthpiece held in the mouth, and this enables one to communicate safely at a clear and distinct speech level.

Also, there is provided an underwater microphone, further comprising:

a bottom-closed cylindrical body disposed on the inner periphery of the exhalation pipe, with the sound signal—electric signal converter device fixed to an inner bottom of the cylindrical body, a diaphragm supported at an open end of the cylindrical body for vibratory movement in the axial direction of the cylindrical body, and a spring member attached at one end to the inner side of the diaphragm through a resilient member and fixed at other end to the sound signal—electric signal converter device.

According to the seventh embodiment of the present invention, when vibrations of the diaphragm are transmitted to the sound signal—electric signal converter device through an air layer within the cylindrical body, sound within a sound range lower than the range of voices are canceled by the elastic member and the spring member and, therefore, the noise of bubbles within the lower sound range can be minimized. As the water becomes deeper, the pressure of air applied on the diaphragm becomes greater according to the water pressure so that the diaphragm is forced inward against the biasing force of the spring member so that the diaphragm is suitably retained within the cylindrical body according to the air pressure. Without the necessity of increasing the thickness of the diaphragm, therefore, an air layer can be secured for transmitting a sound signal between the diaphragm and the sound signal—electric signal converter device. Thus, an underwater microphone capable of withstanding the water pressure at a water depth of 40 m can be realized. Further, by reducing the thickness of the diaphragm it is possible to enhance the performance of the microphone in respect of sound collection and sound quality.

Also, there is provided a closed-type sound converter comprising:

a closed vessel having an elastically deformable acoustic diaphragm, an electric signal—mechanical vibration signal converter device mounted in the closed vessel so as to be spot-joined to the acoustic diaphragm which is operative to convert an electric signal into a mechanical vibration signal thereby to vibrate the acoustic diaphragm through the spot joined portion, and an elastically deformable support plate disposed in the closed vessel to define an enclosed space in cooperation with the acoustic diaphragm and to support the electric signal—mechanical vibration signal converter device.

According to the eighth embodiment of the present invention, by adjusting the thickness of the acoustic diaphragm spot-joined to the electric signal—mechanical vibration signal converter device thereby to adjust the characteristic vibration frequency of the acoustic diaphragm to, for example, a frequency (e.g., 3.4 kHz) within a medium voice range in particular, sound of voices within the medium voice range is intensified by resonance of the acoustic diaphragm so that sufficient sound pressure can be obtained in the medium voice range. Thus, any sound pressure in an acoustic range lower than the range of voices can be suppressed and, therefore, acoustic information transmitted underwater through vibrations of the acoustic diaphragm can be received at an improved articulation level. As the water becomes so deep that the water pressure is increased, the acoustic diaphragm is pressed inward to be elastically deformed so that, for example, air filled between the acoustic diaphragm and the support plate is compressed so that the support plate is elastically deformed and bent inward under the pressure of the compressed air. However, the electric signal—mechanical vibration signal converter device for vibrating the acoustic diaphragm through the spot-joint portion is not liable to the influence of water pressure. Thus, a closed-type sound converter capable of withstanding the water pressure at a water depth of 40 m can be realized.

Also, there is provided a closed-type sound converter, wherein:

the electric signal—mechanical vibration signal converter device comprises a voice coil spot-joined to the acoustic diaphragm, and a magnet portion defining a closed magnetic path intersecting the voice coil.

According to the ninth embodiment of the present invention, when an electric signal representing a sound of voice is input to the voice coil so that an electric current representing the sound of voice flows across the voice coil, the voice coil which intersects a closed magnetic path defined by the magnet portion vibrates in the axial direction, whereupon the acoustic diaphragm spot-joined to the voice coil outputs a mechanical vibration signal. Therefore, the electric signal—mechanical vibration signal converter device may be of simple construction and is capable of readily converting the electric signal into a mechanical vibration signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The underwater communication apparatus, underwater microphone, and closed-type sound converter in accordance with the present invention will now be described in detail with reference to embodiments shown in the accompanying drawings.

Figure 1:
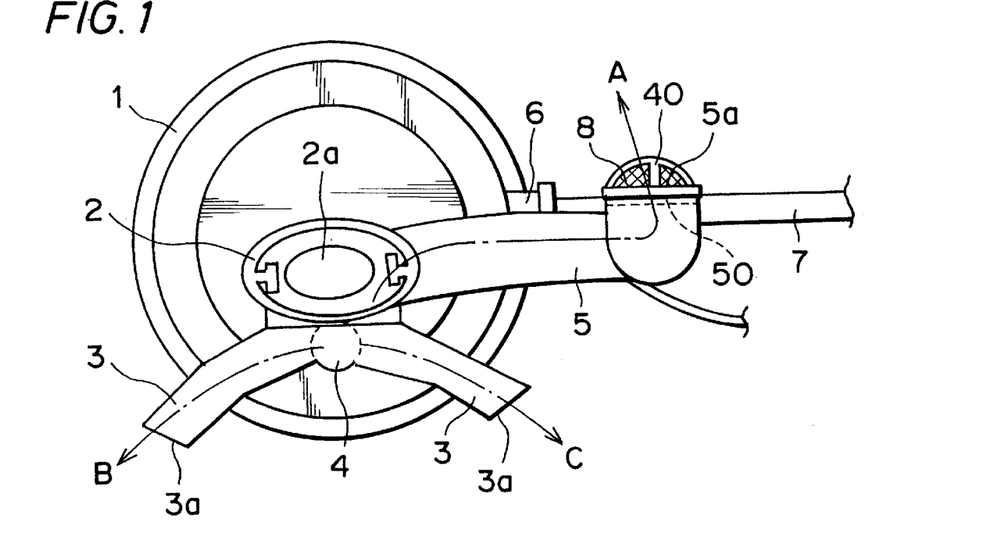
FIG. 1 is a rear view of a mouthpiece-equipped regulator having an underwater microphone in an underwater communication apparatus representing one embodiment of the invention.
Figure 2:
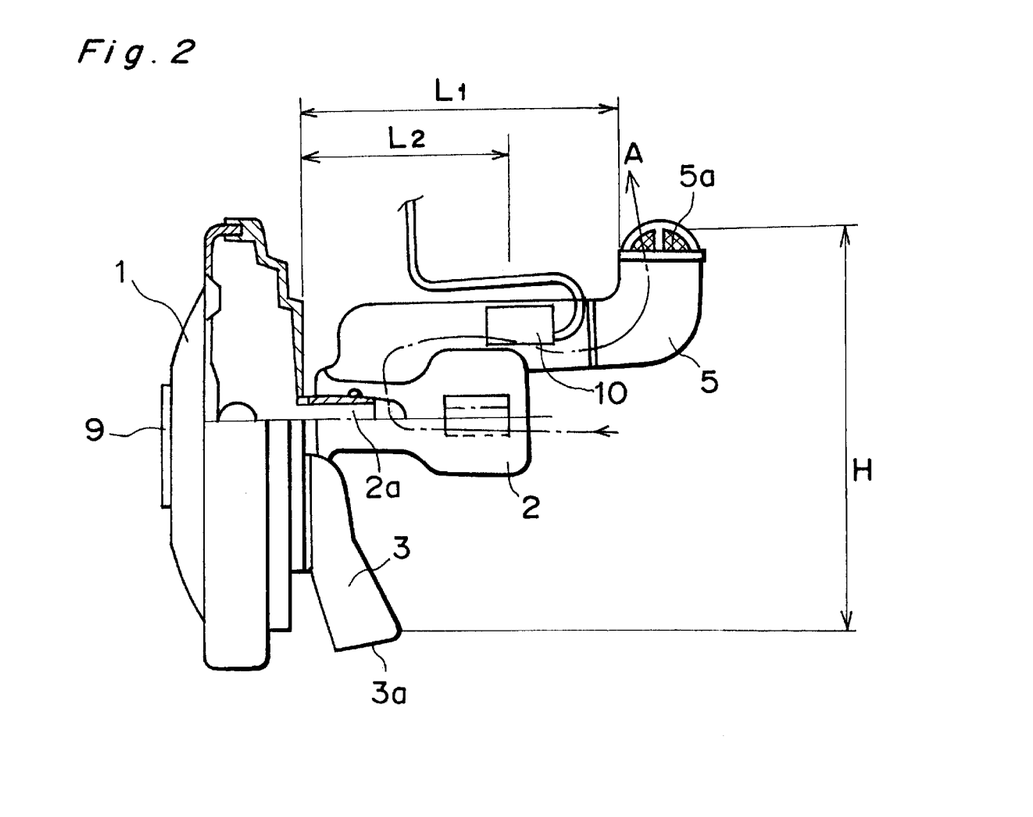
FIG. 2 is a side view of the mouthpiece-equipped regulator.

FIG. 1 is a rear view of a mouthpiece-equipped regulator having an underwater microphone in an underwater communication apparatus representing one embodiment of the invention. FIG. 2 shows the mouthpiece-equipped regulator in side elevation.

In FIG. 1, reference numeral 1 designates a hollow, disc-shaped oxygen inhale-exhale regulator; 2 designates a silicone rubber-made aqualung mouthpiece provided on the rear side of the regulator 1; 3, 3 designate regulator exhaust pipes disposed on the rear side of the regulator 1 and extending from beneath the mouthpiece 2 and in laterally opposite, obliquely downward directions; 4 designates a regulator exhaust valve disposed centrally of the pair of regulator exhaust pipes 3, 3; and 5 designates a silicone rubber-made exhalation pipe operative as an acoustic space member extending laterally from a site adjacent a breathing port 2a of the mouthpiece 2. The exhalation pipe 5 defines an acoustic space communicating with an interior space of the mouthpiece 2, and includes a sound receiver 10 mounted to the inner periphery of the exhalation pipe 5 (see FIG. 2). The exhalation pipe 5 is bent at about middle of its length into a generally L-shaped configuration, with its distal end bent upward. At an exhaust port 5a of the exhalation pipe 5 there are provided an exhaust valve 50 and a screen 8 covered with a cover 40. An oxygen inhale pipe 6 provided on the outer periphery of the regulator 1 is connected to a compressed air-filled cylinder (not shown) through an air pipe 7 to enable air supply from the cylinder into the regulator 1. An air purge button 9 is provided generally centrally on the front of the regulator 1 (see FIG. 2). When the air purge button 9 is depressed, air is forcibly supplied from the cylinder into the regulator 1. In FIG. 2, $L_1$ designates the length of a path extending from a breathing port 2a of the mouthpiece 2 to the exhaust port 5a of the exhalation pipe 5, and $L_2$ designates the length of a path extending from the breathing port 2a of the mouthpiece 2 to the sound receiver 10. The path length $L_2$ relative to the path length $L_1$ is previously adjusted according to the water pressure under which the underwater communication apparatus is used.

Figure 3:
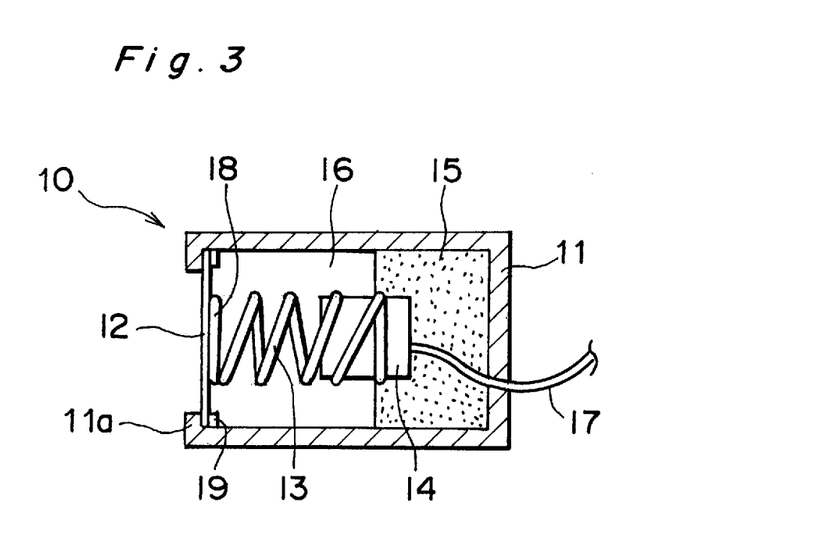
FIG. 3 is a sectional view of a sound receiver portion in FIG. 2.

FIG. 3 is a sectional view of the sound receiver 10 shown in FIG. 2. The sound receiver 10 includes a bottom-closed cylindrical case 11, a diaphragm 12 supported at an open end of the case 11 for vibratory movement in the axial direction of the case 11, a coil spring 13 operative as an elastic member fixed at one end to the inner side of the diaphragm 12 through a resilient member 18, and a capacitor microphone 14 operative as a sound signal—electric signal converter device to which the coil spring 13 is fixed at its other end by being fitted thereon, the capacitor microphone 14 being fixed by an adhesive 15 to the bottom of the case 11 at one side opposite to the diaphragm 12 of the microphone 14. A dynamic microphone or the like may be used in place of the capacitor microphone 14. At the open end of the case 11 there is formed a radially inwardly projecting flange 11a, and opposite to the flange 11a an annular member 19 is fixed to the diaphragm 12 over a peripheral edge portion thereof, the diaphragm 12 being axially outwardly biased by the coil spring 13. In place of the coil spring 13, sponge material may be used as the elastic member.

Figure 4:
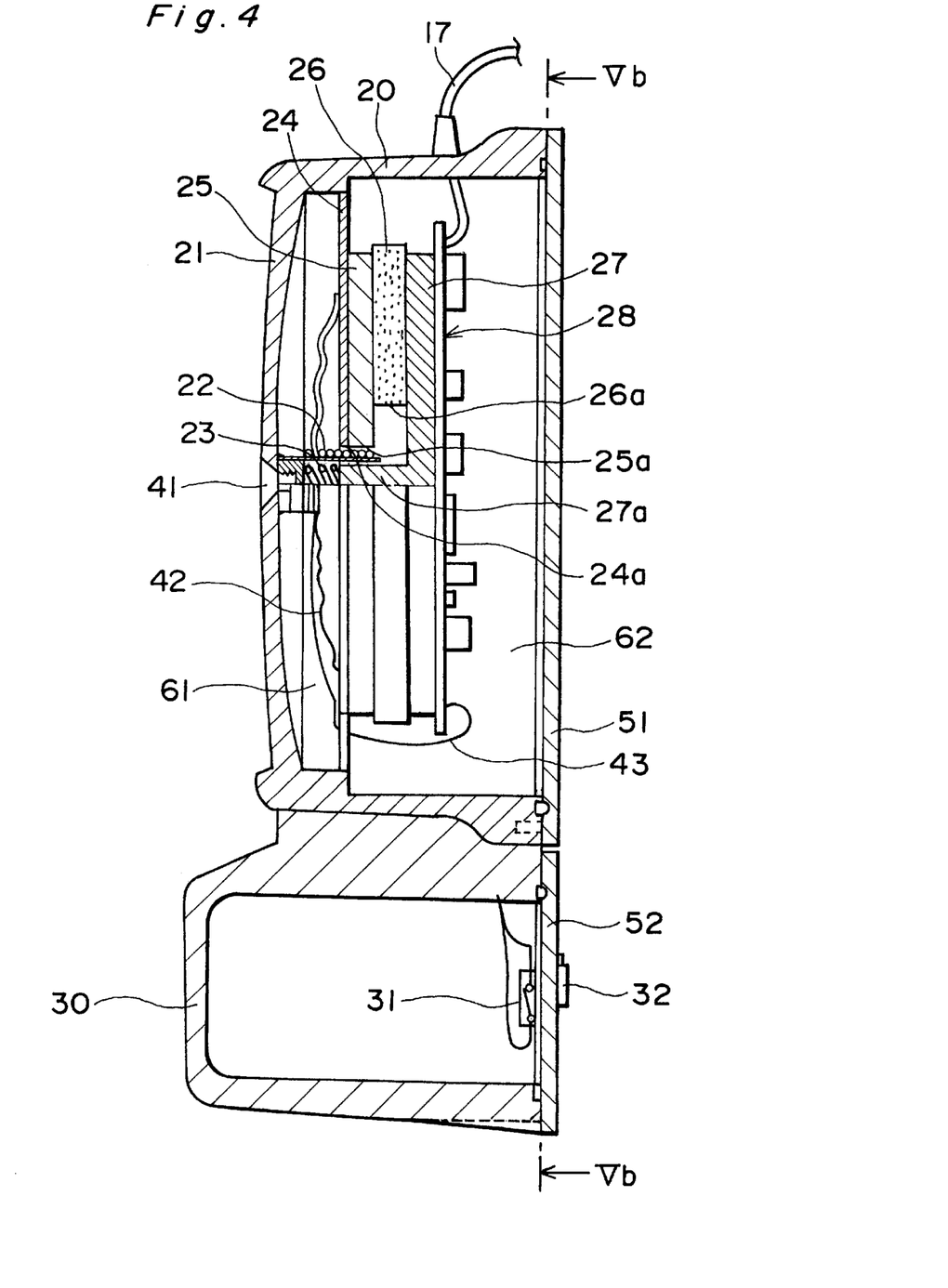
FIG. 4 is a sectional view of a waterproof speaker of the underwater communication apparatus.
Figure 5A:
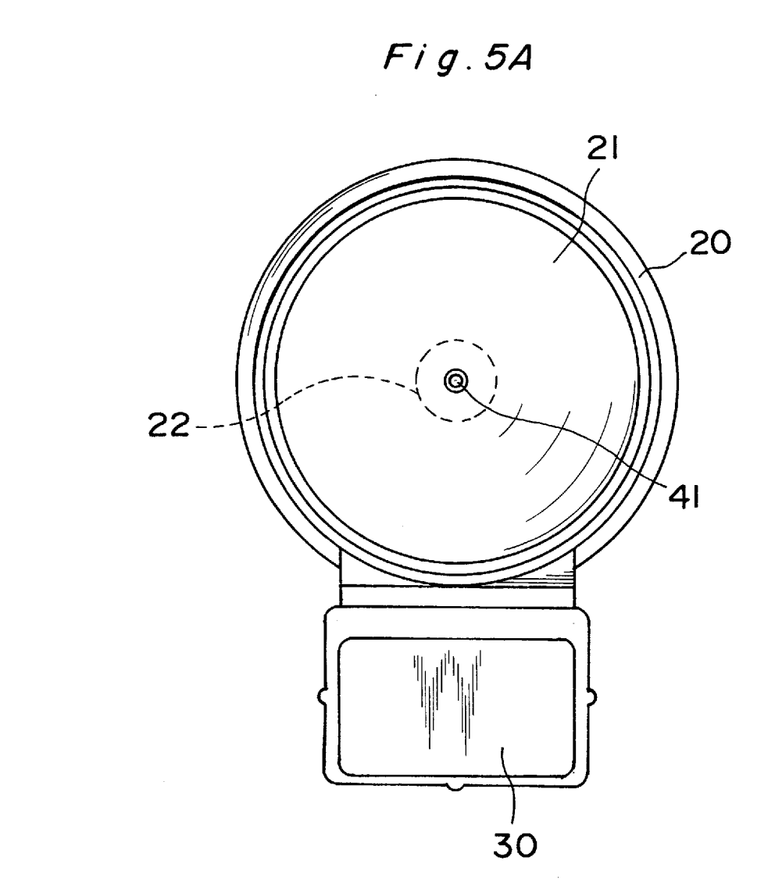
FIG. 5A is a front view of the waterproof speaker shown in FIG. 4.
Figure 5B:
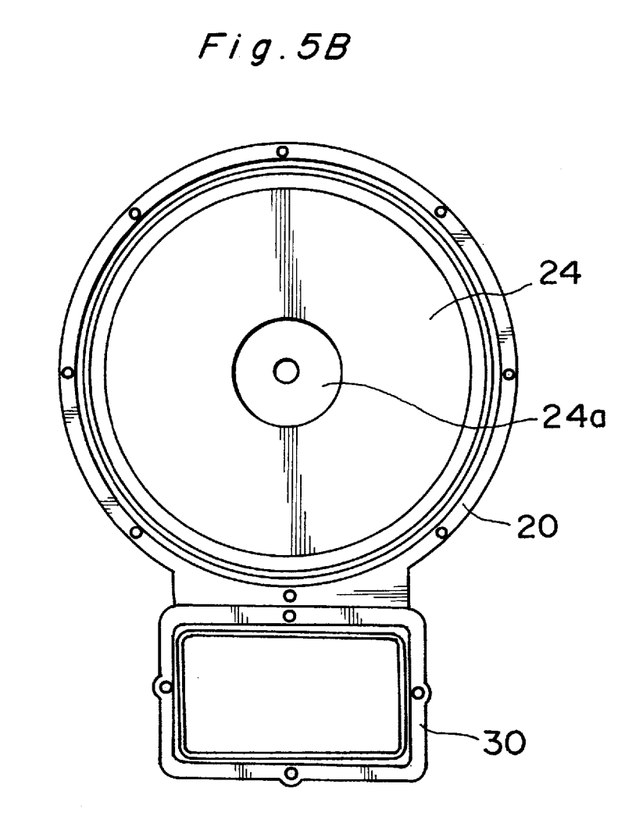
FIG. 5B is a view taken along the line Vb—Vb in FIG. 4.

FIG. 4 shows in section a waterproof speaker as a closed-type sound converter of the underwater communication apparatus. FIG. 5A shows the waterproof speaker in front elevation, and FIG. 5B shows a section taken on the line Vb—Vb in FIG. 4.

Referring to FIG. 4, the waterproof speaker includes a cylindrical body case 20 having at one end an elastically deformable acoustic diaphragm 21, a voice coil 22 spot joined at one end via a voice coil fixing element 41 to the acoustic diaphragm 21 at a generally central spot thereof (see FIG. 5A), a spring member 23 abutting at one end against the voice coil fixing element 41 on the inner periphery side of the voice coil 22, the other end of the spring member 23 abutting against the front end of a cylindrical portion 27a of a second polar piece 27, therefore the spring member 23 being compressed between the above both ends, an elastically deformable, disc-shaped support plate 24 fixed to the inner periphery side of the body case 20 and having a bore 24a formed generally centrally of the support plate 24 so as to enable the voice coil 22 to extend therethrough, a first polar piece 25 of doughnut disc shape fixed at one end to one end of the support plate 24 opposite to the acoustic diaphragm 21 and having a bore 25a formed generally centrally of the support plate 24 so as to enable the voice coil 22 to extend therethrough, a doughnut disc shaped permanent magnet 26 fixed at one end to the other end of the first polar piece 25, a disc shaped second polar piece 27 fixed at one end to the other end of the permanent magnet 26 and having a cylindrical portion 27a extending centrally toward the acoustic diaphragm 21, and a sound signal amplifier substrate 28 mounted to the other end of the second polar piece 27. The voice coil 22 is joined to the acoustic diaphragm 21 via the voice coil fixing element 41 by two methods. One method is the indirect joining method shown in FIG. 4 in which the voice coil 22 does not abut against the acoustic diaphragm 21 and which is used for causing the acoustic diaphragm 21 to resonate with a sound of specified frequency, for example an underwater sound of whistle. The other method is the direct joining method (not shown) in which the voice coil 22 abuts against the acoustic diaphragm 21 and which is used for causing the acoustic diaphragm 21 to respond to a sound of wide frequency range, for example a voice in water or in humid air. Above said first polar piece 25, permanent magnet 26, second polar piece 27, and sound signal amplifier substrate 28 constitute an electric mechanical vibration signal converter device which is supported by the support plate 24 within the body case 20. The cylindrical portion 27a of the second polar piece 27 extends through the bore 24a of the support plate 24 and is fitted into the voice coil 22. An opening of the body case 20 which is located opposite to the acoustic diaphragm 21 is closed by a back cover 51. Thus, a closed vessel is formed which comprises the body case 20 and the back cover 51. A magnetic flux emanating from the permanent magnet 26 defines a closed magnetic path such that the magnetic flux intersects the voice coil 22 through the first polar piece 25 and the cylindrical portion 27a of the second polar piece 27. The sound signal amplifier substrate 28 is operative to amplify a sound-representing electric signal input from the capacitor microphone 14 shown in FIG. 3 through a microphone cable 17 and to transmit the amplified electric signal to the voice coil 22. The voice coil fixing element 41 has, in addition to its fixing function, a role to dissipate heat from the voice coil 22 outward. Heat from the voice coil 22 is also dissipated toward the second polar piece 27 through both the voice coil fixing element 41 and the spring member 23 (internal heat dissipation). Where no much water pressure is applied, for example, in the case of a water depth of up to 15 m, a space 62 between the support plate 24 and the back cover 51 may be filled with silicone rubber or the like.

A battery case 30 is fixed to the underside of the body case 20, and a power switch 32 is provided on the exterior of a back cover 52 for covering an opening of the battery case 30. A magnet switch 31 fitted on the interior side of the back cover 52 is turned on by the power switch 32 for supplying power from the battery in the battery case 30 to the sound signal amplifier substrate 28 in the body case 20.

In the underwater communication apparatus of the above described construction, the acoustic space within the exhalation pipe 5 permits easy exhalation when speaking is made, with the mouthpiece 2 shown in FIG. 1 being held in the mouth, even where the water pressure is high. The air exhaled upon utterance of voice is exhausted through the exhalation pipe 5, exhaust valve 50, and screen 8 as shown by the arrow A in FIGS. 1 and 2. In this case, by adjusting the position of the exhaust port 5a of the exhalation pipe 5 relative to the regulator exhaust port 3a so that the position of the former is made higher by H (as shown in FIG. 2), air from the exhaust port 5a of the exhalation pipe 5 positioned nearer to the water surface is exhausted earlier because of a slight difference in water pressure. Air exhaled through normal breathing is exhausted from the exhaust port 5a of the exhalation pipe 5 and is also exhausted, as shown by arrows B, C in FIG. 1, from the regulator exhaust ports 3a, 3a of the regulator 1 through the regulator exhaust valve 4. Therefore, exhaust of bubbles from the regulator exhaust ports 3a, 3a does not coincide with exhaust of bubbles from the exhaust port 5a of the exhalation pipe 5, and this results in noise reduction, thus enabling clear and distinct sound catching. Moreover, the air exhaled upon voice being uttered is exhausted in the form of bubbles from the exhaust port 5a located downstream of the sound receiver 10 and, therefore, the capacitor microphone 14 of the sound receiver 10 is not liable to the effect of bubble noise from the downstream side. Therefore, any sound from the upstream side, that is, from the mouthpiece 2 can be clearly and distinctly received. An electric signal output from the capacitor microphone 14 is input through the microphone cable 17 to the sound signal amplifier substrate 28 in which the electric signal is amplified. The amplified electric signal is input to the voice coil 22 via a signal line 43. When a current representing the sound flows across the voice coil 22, the voice coil 22, which intersects a closed magnetic path defined by aforesaid magnet portion, vibrates in the axial direction to cause the acoustic diaphragm 21 spot joined to the voice coil 22 to output a mechanical vibration signal thereby to transmit a sound wave underwater.

Therefore, the underwater communication apparatus including the underwater microphone and the waterproof speaker enables one to speak with the mouthpiece 2 held in the mouth and thus to communicate safely in a clear and distinct speech level. The apparatus does not require any such full-mask type underwater mask and/or supersonic transmitter-receiver as used in conventional underwater communication apparatuses for supersonic transmission of acoustic information. This provides substantial cost advantage.

In the underwater microphone, pores of the screen 8 attached to the exhaust port 5a of the exhalation pipe 5 act in such a way that bubbles of air exhausted when voice is uttered are reduced to a minimum possible size so that noise of bubbles can be reasonably controlled to enable the capacitor microphone 14 to catch sounds at an improved articulation level.

Further, the underwater microphone is such that when vibrations of the diaphragm 12 in the bottom-closed cylindrical case 11 disposed in the exhalation pipe 5 are transmitted to the capacitor microphone 14 through an air layer in the internal space 16 of the case 11, sounds of a lower range than the range of voices are attenuated by the elastic member 18 and coil spring 13 so that the noise of bubbles in the lower sound range can be reduced. As the water depth increases, the water pressure exerted upon the diaphragm 12 becomes greater so that the diaphragm 12 is forced inward against the biasing force of the coil spring 13 so as to be retained within the case 11 by the coil spring 13 according to the water pressure. Therefore, without the necessity of increasing the thickness of the diaphragm 12, an air layer for sound signal transmission can be secured between the diaphragm 12 and the capacitor microphone 14. Therefore, the underwater microphone can withstand the water pressure even where the water is 40 m deep and, by reducing the thickness of the diaphragm 12, it can be made to exhibit improved performance in respect of sound collection and sound quality.

With the waterproof speaker, it is possible to adjust the thickness of the acoustic diaphragm 21 spot-joined to the voice coil 22 so as to adjust the characteristic vibration frequency of the acoustic diaphragm 21 to a frequency (e.g., 3.4 kHz) within a medium voice range, whereby sound of voices within the medium voice range is intensified by resonance of the acoustic diaphragm 21 so that sufficient sound pressure can be obtained in the medium voice range while sound of the lower sound range is suppressed. Thus, acoustic information given underwater through vibrations of the acoustic diaphragm 21 can be transmitted at an improved articulation level and over a wide range, say, over a radius of 10 m or more. As the water depth increases, the acoustic diaphragm 21 is pressed inward to be elastically deformed so that the voice coil 22, in conjunction with the voice coil fixing element 41, moves inward against the biasing force of the spring member 23. As the water becomes further deep, an air layer between the acoustic diaphragm 21 and the support plate 24 is compressed, and the support plate 24 is bent backward under the pressure of the compressed air so that a magnet portion mounted to the support plate 24, namely, the first polar piece 25, permanent magnet 26, and second polar piece 27, and the sound signal amplifier substrate 28 are moved backward. Thus, when the water becomes deeper and the water pressure becomes greater, there is little or no change in the position of the magnet portion, i. e., first polar piece 25, permanent magnet 26, and second polar piece 27, relative to the voice coil 22. Therefore, the voice coil 22 for vibrating the acoustic diaphragm 21 through the spot joint portion (voice coil fixing element 41) is not liable to the influence of water pressure; hence, the waterproof speaker can withstand the water pressure at a water depth of 40 m.

As already stated, the waterproof speaker includes the voice coil 22 spot-joined to the acoustic diaphragm 21, and the magnet portion comprising the first polar piece 25, permanent magnet 26, and second polar piece 27, and defining a closed magnetic path intersecting the voice coil 22. Despite such simple construction, therefore, the waterproof speaker can readily convert an electric signal into a mechanical vibration signal.

In the above described embodiment, the underwater microphone used in the underwater communication apparatus is not intended to be limited to underwater use, but may be used as a complete waterproof type microphone on land.

In the foregoing description, the waterproof speaker shown in FIG. 4 is taken up as a preferred form of the closed-type sound converter, but it is to be understood that the embodiment is illustrative and not restrictive. The closed-type sound converter of the invention may be used at locations where air is present (particularly at humid locations). The closed-type sound converter of the invention may be used in a sound range of 50 Hz to 14 kHz by varying the thickness of the acoustic diaphragm. The closed-type sound converter is applicable to microphones as well.

In the above described embodiment, the acoustic diaphragm 21 of the waterproof speaker as a closed-type sound converter is gradually reduced in thickness toward the center. The thickness of the acoustic diaphragm 21 may be suitably selected within a thickness range of 0.5 mm to 5 mm according to the material used or the like. While the acoustic diaphragm embodied herein has an outwardly gently curved surface, it may be constructed in such a way that the outer side of the diaphragm has a flat surface and its interior side has a forwardly gently curved surface. If it is desired that the frequency of resonance of the acoustic diaphragm be made higher, a stainless steel-made acoustic diaphragm may be used. In case that the acoustic diaphragm of the closed-type sound converter is made of stainless steel, the diaphragm may be so constructed that it is gently curved without any change in the thickness of the entire diaphragm.

In the waterproof speaker shown in FIG. 4 as a form of closed-type sound converter, the acoustic diaphragm 21 is formed integrally with the cylindrical body case 20 as a closed container. As an alternative, however, an acoustic diaphragm and a closed container, separately fabricated, may be used in combination.

In the foregoing embodiment, the underwater communication apparatus of the invention is illustrated as an aqualung underwater communication apparatus, but is not intended to be limited to aqualung-related use. This underwater communication apparatus may be applicable for use with all kinds of diving equipment.

In the above described underwater microphone as an embodiment of the invention, the sound receiver 10 is mounted to the inner wall of the exhalation pipe 5 as an acoustic space member. Alternatively, however, the sound receiver 10 may be suspended by a string means or the like, being positioned away from the inner wall of the acoustic space member.

Figure 6:
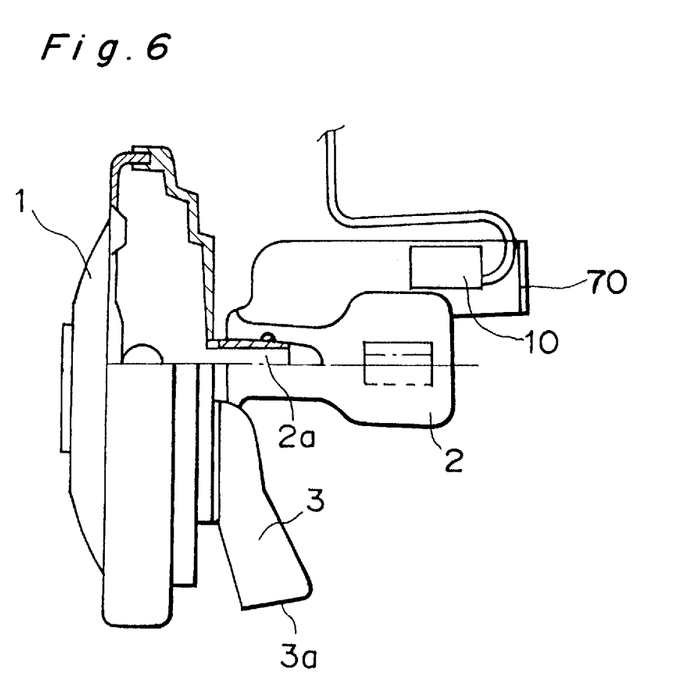
FIG. 6 is a side view of a mouthpiece-equipped regulator having an underwater microphone in another embodiment.

In the foregoing embodiment, the exhalation pipe 5 is used as an acoustic space member of the underwater microphone; alternatively, however, a pipe 70 may be used which extends laterally from a location adjacent the inhale/exhale port 2a of the mouthpiece 2 and is end-closed with no exhaust port. The pipe 70 has therein an acoustic space communicating with an interior space of the mouthpiece 2 and is fitted therein with a sound receiver 10. In this case, if the water is so shallow, say, 10 m for example, as to permit easy exhalation, the air exhaled is exhausted from the regulator exhaust port 3a of the regulator exhaust pipe 3, and voice is transmitted from the inner space of the mouthpiece 2 over the acoustic space within the pipe 70 and is received by the capacitor microphone (not shown) of the sound receiver 10 at a clear and distinct sound level. In FIG. 6, the arrangement is identical to that of the mouthpiece-equipped regulator shown in FIGS. 1 and 2, with the exception of underwater microphone; therefore, like parts are designated by like reference numerals and description of such parts is omitted for the sake of brevity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An underwater communication apparatus comprising an underwater microphone including an acoustic space member connected at one end to a site adjacent a breathing port of an aqualung mouthpiece to define an acoustic space communicating with an interior space of the mouthpiece, and a sound signal-electric converter device disposed in the interior of the acoustic space member at a position spaced from said breathing port, said sound signal-electric converter device being operable to convert a sound signal into an electric signal; and a closed-type sound converter for transmitting a sound wave underwater on the basis of an output of the sound signal-electric signal converter device of the underwater microphone.

2. An underwater communication apparatus as claimed in claim 1, wherein:

the acoustic space member is an exhalation pipe provided with an exhaust valve which allows the flow of air only from the mouthpiece toward an exhaust port, the underwater microphone being disposed upstream of the exhaust valve.

3. An underwater communication apparatus as claimed in claim 2, wherein:

the underwater microphone includes a screen having pores for reducing in size bubbles of air exhausted from the exhaust valve.

4. An underwater communication apparatus as claimed in claim 2, wherein:

the underwater microphone includes a bottom-closed cylindrical body disposed on the inner periphery of the exhalation pipe, with the sound signal—electric signal converter device fixed to an inner bottom of the cylindrical body, a diaphragm supported at an open end of the cylindrical body for vibratory movement in the axial direction of the cylindrical body, and an elastic member attached at one end to the inner side of the diaphragm through a resilient member and fixed at other end to the sound signal—electric signal converter device.

5. An underwater communication apparatus as claimed in claim 1, wherein:

the closed-type sound converter includes a closed vessel having an elastically deformable acoustic diaphragm, an electric signal—mechanical vibration signal converter device mounted in the closed vessel so as to join with the acoustic diaphragm which is operative to convert an electric signal into a mechanical vibration signal thereby to vibrate the acoustic diaphragm through a joint portion, and an elastically deformable support plate disposed in the closed vessel to define an enclosed space in cooperation with the acoustic diaphragm and to support the electric signal—mechanical vibration signal converter device.

6. An underwater microphone comprising an exhalation pipe connected at one end to a site adjacent a breathing port of an aqualung mouthpiece to define an acoustic space communicating with an interior space of the mouthpiece, an exhaust valve provided in the exhalation pipe which allows the flow of air only from the mouthpiece toward an exhaust port, a sound signal-electric signal converter device disposed on the inner periphery side of the exhalation pipe and upstream of the exhaust valve at a position spaced from said breathing port, said sound signal-electric signal converter device operative to convert a sound signal into an electric signal; and a screen having pores for reducing in size bubbles of air exhausted from the exhaust valve.

7. An underwater microphone as claimed in claim 6, further comprising:

a bottom-closed cylindrical body disposed on the inner periphery of the exhalation pipe, with the sound signal—electric signal converter device fixed to an inner bottom of the cylindrical body, a diaphragm supported at an open end of the cylindrical body for vibratory movement in the axial direction of the cylindrical body, and a spring member attached at one end to the inner side of the diaphragm through a resilient member and fixed at other end to the sound signal—electric signal converter device.

8. A closed-type sound converter comprising:

a closed vessel having an elastically deformable acoustic diaphragm, an electric signal—mechanical vibration signal converter device mounted in the closed vessel so as to be spot-joined to the acoustic diaphragm which is operative to convert an electric signal into a mechanical vibration signal thereby to vibrate the acoustic diaphragm through the spot joined portion, and an elastically deformable support plate disposed in the closed vessel to define an enclosed space in cooperation with the acoustic diaphragm and to support the electric signal—mechanical vibration signal converter device.

9. A closed-type sound converter as claimed in claim 8, wherein:

the electric signal—mechanical vibration signal converter device comprises a voice coil spot-joined to the acoustic diaphragm, and a magnet portion defining a closed magnetic path intersecting the voice coil.

10. An underwater communication apparatus as claimed in claim 1, wherein said acoustic space member is defined by an exhalation pipe connected at one end to a site adjacent a breathing port of an aqualung mouthpiece, and further comprising an exhaust valve provided in said exhalation pipe which allows the flow of air only from the mouthpiece toward an exhaust port, wherein said exhalation pipe exhaust port is positioned higher than a regulator exhaust port.

11. An underwater communication apparatus as claimed in claim 1, wherein said sound signal-electric signal converter device is disposed at a position in the interior of said acoustic space member determined in accordance with water pressure under which the underwater communication device is expected to operate.

12. An underwater communication apparatus as claimed in claim 1, further comprising a waterproof speaker, wherein a voice coil of said waterproof speaker is fixed to an acoustic diaphragm by an indirect joining method wherein the voice coil does not abut against the acoustic diaphragm.

13. An underwater communication apparatus according to claim 1, further comprising a waterproof speaker, wherein a voice coil of said waterproof speaker is fixed to an acoustic diaphragm by a direct joining method wherein the voice coil abuts against the acoustic diaphragm.

14. An underwater microphone as claimed in claim 6, wherein:

an exhaust port of the exhalation pipe is positioned higher than a regulator exhaust port.

15. A closed-type sound converter according to claim 8, wherein said electric signal-mechanical vibration signal converter device includes a voice coil which is fixed to said acoustic diaphragm by an indirect joining method wherein the voice coil does not abut against said acoustic diaphragm.

16. A closed-type sound converter according to claim 8, wherein said electric signal-mechanical vibration signal converter device includes a voice coil which is fixed to said acoustic diaphragm by a direct joining method wherein the voice coil abuts against said acoustic diaphragm.

17. A closed-type sound converter comprising:

a closed vessel having an elastically deformable acoustic diaphragm, a voice coil receiving an electric signal and accommodated in the closed vessel so as to be joined at its one end to an inner surface of the acoustic diaphragm, an elastically deformable support plate disposed in the closed vessel to define a space in cooperation with the acoustic diaphragm and to have a bore in which the voice coil is fitted, a permanent magnet composed of a cylindrical portion fitting movably in an axial direction in the voice coil and a disk portion fixed to a back surface of the support plate to seal the space hermetically, wherein when the acoustic diaphragm is subjected to an external water pressure to be elastically deformed, the support plate is deformed due to pressure of the hermetically sealed space so that a position of the voice coil relative to the permanent magnetic is kept substantially constant.

* * * * *